Jan. 17, 1939. J. L. IRVIN 2,144,063
METHOD AND APPARATUS FOR EMBEDDING SUBMARINE PIPE LINES
Filed Nov. 4, 1938
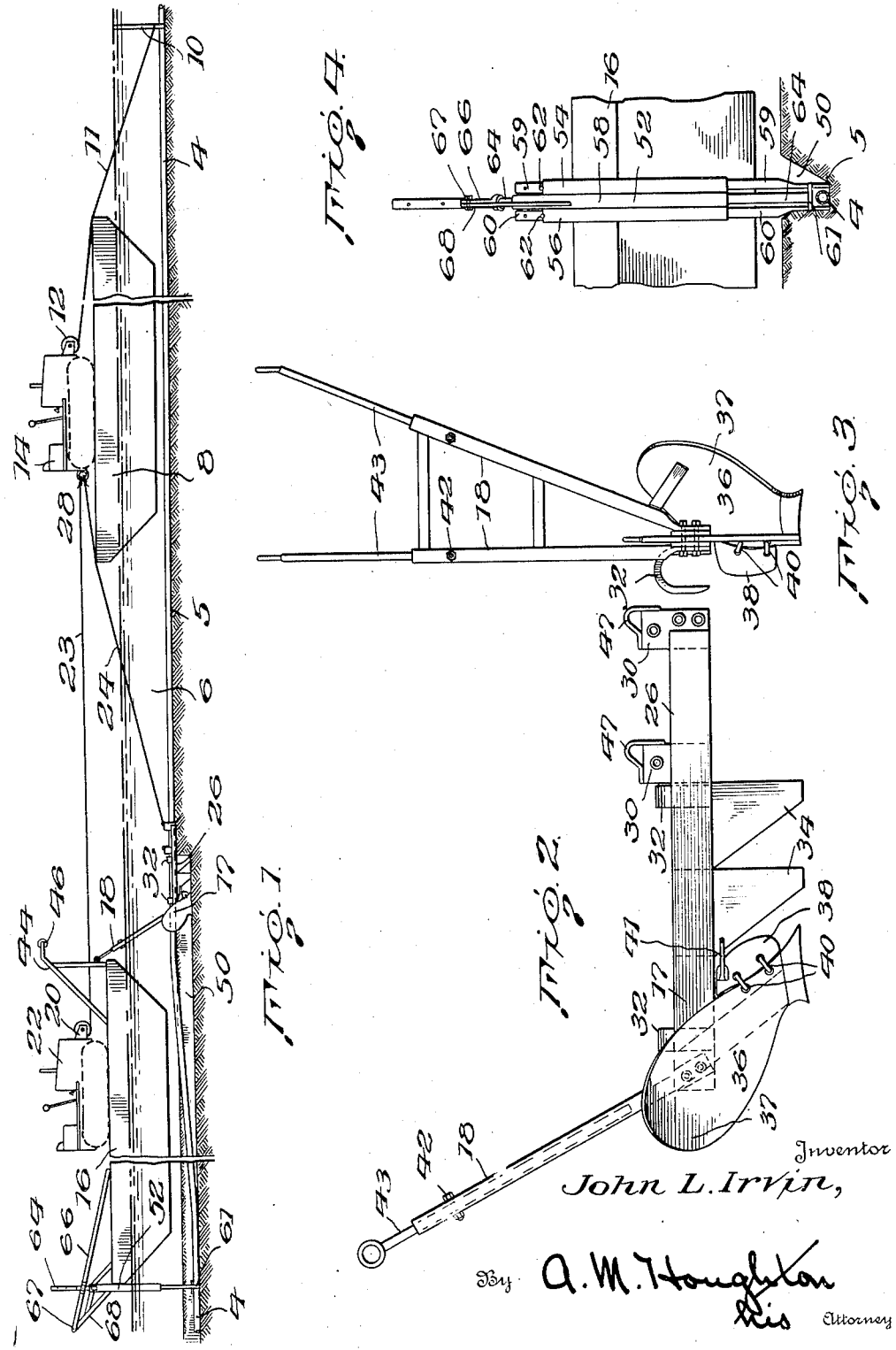
Inventor
John L. Irvin,
By A. M. Houghton
his Attorney Patented Jan. 17, 1939

2,144,063

UNITED STATES PATENT OFFICE 2,144,063

METHOD AND APPARATUS FOR EMBEDDING SUBMARINE PIPE LINES

John L. Irvin, Southside Place, Tex., assignor to Gulf Oil Corporation, Pittsburgh, Pa., a corporation of Pennsylvania Application November 4, 1938, Serial No. 238,904

18 Claims. (Cl. 61—72)

This invention relates to submarine pipe lines, and it comprises a method of and apparatus for ditching or embedding pipe lines under water, and especially for ditching or embedding pipe lines previously laid on the bed of a body of water.

It is frequently desirable to lay pipe lines for water, gas, oil, or other fluids under water; that is, across the bed of a river, or a lake, or a swamp, or some other body of water. Considerable difficulty has been encountered heretofore with such submarine pipe lines, because it is often necessary or desirable to place them in positions where they may be fouled by boats, anchors, fishermen's nets, etc. It is not particularly difficult to lay or string the pipe itself across the bottom of a swamp, stream, or other body of water; but after laying, the pipe ordinarily remains exposed on the water bed, unless special measures are taken to cover it. Because of the relatively large size and heavy weight of pipe lines, and their comparative lack of flexibility, it has not been possible to apply methods of laying or embedding them under the surface of a water bed, such as those which have been employed in laying submarine cables, for example.

So far as I am aware, prior to this invention there has been no method or apparatus available for progressively ditching or embedding long lengths of connected pipe lines in a water bed, with control from the surface. An object achieved by my present invention is to provide a method of, and apparatus for, accomplishing this. A more specific object achieved by my invention is to provide a method of and apparatus for digging a trench adjacent and partially under a connected pipe line previously laid on the bed of a body of water, and placing the pipeline in the trench.

I have found that these desirable results are achieved by the use of certain apparatus constituting a part of my invention, this apparatus including a plow adapted to dig a trench in the water bed parallel with and partially under the previously laid pipeline, while controlled and actuated from the surface of the water. A plow which I have found especially desirable for this purpose has certain novel structural features which are described in more detail hereinbelow. The handles of the plow are advantageously connected to a barge or the like, which floats on the water above the pipeline. This barge is advantageously provided with a winch adapted to apply sufficient force to a cable attached thereto to move the barge or lift the plow; and it is also advantageously provided with means for jacking or tamping the pipeline into the trench or ditch formed by the plow; all as described in more detail hereinbelow.

In operation, the plow is put in position on the bottom of the swamp or other body of water, adjacent a previously laid pipeline resting on the water bed. A cable, chain or other means for transmitting force is connected to the draw-bar of the plow, and extends forward therefrom to some means for applying sufficient force to advance the plow along the pipeline. This means may be another barge, which can be advanced along the pipeline by a power boat or by a winch mounted on the barge or in advance of the barge. As alternatives, the cable may extend from the plow directly to a power boat, or to a winch or the like mounted in advance of the plow along the pipeline. For practical reasons, I generally find it most convenient to connect the cable from the plow draw bar to a forward or "leading" barge, which is advanced along the pipeline in any suitable manner, as by a winch and a cable extending forward to an anchor beside the pipeline. The second barge, which is connected to the plow handles, is sometimes designated the connected barge, or the control barge. Advantageously, this second barge is also connected to the leading barge or other means for applying force, as by a cable attached to the leading barge and passing over a winch on the second barge.

When the leading barge or other means for applying force is advanced along the pipeline, it pulls on the plow cable, advancing the plow and the connected barge along the pipeline. The plow forms a trench adjacent and partially under the pipeline, into which the pipe generally slides without further attention, due to the force of gravity. A jack is advantageously provided on the rear of the control barge, however, so designed, in accordance with my invention, that it automatically tends to force or guide the pipe into the trench as the barge moves along the pipeline. In addition, if necessary, the pipe may be further forced or tamped into place in the ditch by a ram or other suitable device operated from the barge, and advantageously connected with the jack. When the depth of the water beneath which the pipeline is being trenched varies, as is usually the case, it is frequently desirable to vary correspondingly the relative position of the plow and the control barge, and the length of the plow handles. This may be readily accomplished by reeling or unreeling the independent cable connecting the leading barge with the winch on the control barge.

In order that my invention may be more readily understood, it will now be described in connection with the accompanying drawing, in which Fig. 1 is a somewhat diagrammatic elevational view of one form of apparatus in accordance with my invention, adapted for use in practicing the process of my invention;

Fig. 2 is a side elevational view, on a somewhat larger scale, of a form of plow which I have found particularly advantageous for the purposes of my invention;

Fig. 3 is a rear-end view of the plow of Fig. 2; and

Fig. 4 is a rear elevational view of one form of jacking and tamping device adapted for use in accordance with my invention.

Referring now to Fig. 1, 4 indicates a pipeline lying on the bed 5 of a body of water 6, which may be a lake, stream, swamp, or any other body of water. A barge 8 is connected to a post 10 adjacent the pipeline 4, by a cable 11. In the embodiment illustrated, the cable 11 extends to a winch 12, which is mounted on a tractor 14, which is in turn mounted on the barge 8; but the tractor is not an essential part of my invention. The winch may be mounted in any other manner on the barge 8; or it may be omitted if some other means of actuating the barge is provided, such as a power boat, or a winch mounted elsewhere. The post 10, to which the cable 11 is connected, may also be omitted, in which case the cable can be connected directly to the previously laid pipeline 4, or to a tree or other object on the shore, advantageously in line with the pipe.

A working or control barge 16 is also provided, and is connected at its front end with a ditching plow 17, advantageously by a pivot connection with telescoping handles 18 of the plow. This barge 16 is provided with a winch 20, which in the drawing is shown as connected to a tractor 22; but the tractor may be omitted, and the winch 20 may be mounted in any other convenient manner on the barge 16. A cable 23 connects the winch 20 with the leading barge 8, and another cable 24, or other means of suitable strength, such as a chain, extends from a suitable eye or loop at the front of the draw-bar 26 of the plow 17 to the leading barge 8. In the drawing, both of the cables 23 and 24 are shown connected to the rear draw-bar 28 of the tractor 14 on the leading barge. The cables may be connected to any other suitable points on the leading barge, however, or to a ring or chain or the like connected to the barge. Such a ring or chain or the like may well be considered the means for applying force to the cables in various embodiments of my invention, including the embodiments in which the leading barge 8 is omitted and the ring, for example, is connected to a power boat, or to a cable actuated by a winch on the shore.

In operation with the embodiment illustrated, the cable 11 is unreeled from the winch 12 on the leading barge 8, and its end is fastened to the post 10, which is some suitable distance ahead of the barge, such as 500 yards, for example. The winch 12 is then put into operation and winds up the cable 11, advancing the barge 8 along the pipeline. The plow 17 is also advanced along the pipeline by the cable 24; and the control barge 16 is also advanced by its connection with the plow and the cable 23. As noted, the cable 23 is also employed to adjust the distance between the barge 16 and the connecting point 28, in accordance with the depth of the water. When the leading barge 8 is sufficiently close to the post 10, operations are discontinued while the cable 11 is unreeled and connected to another point in advance of the barge along the pipeline. The cycle is then repeated.

In practice, the described apparatus including two barges, and the described method of operation, have been found to be particularly advantageous. Most of the advantages of my invention can be obtained, however, by operating with only the working or control barge 16, omitting the leading barge 8. In that case, the ring or other connecting means 28 may be connected to a cable actuated by a winch on the shore, or directly to a power boat adapted to follow the pipeline, for example. The essential feature here is that there be some means for advancing the plow 17 and the control barge 16 along and parallel with the pipeline.

The type of plow which I have found especially desirable for practicing the process of my invention is illustrated in somewhat more detail in Figs. 2 and 3. This plow comprises a heavy steel beam or draw-bar 26, which is several feet in length, and which is adapted to rest on the bed of the body of water during operation. One or more pull bars or brackets 30 are provided on the beam 26 at or adjacent its forward end, and these bars each have one or more eyes to which the cable 24 may be connected. At suitable points along the draw-bar there are provided clips 32 of inverted U-shape or some other suitable form adapted to fit over the pipeline 4, which is to be ditched or embedded. These clips have the dual function of guiding the plow along the pipeline, thus insuring that the trench is at the right point, and of tending to force the pipeline into the ditch.

Connected to the beam 26 at suitable positions in advance of the plow share proper are scarifiers 34. Two of these scarifiers are generally employed, one being placed behind the other. Their function is to break up oyster shells and other hard materials in the path of the plow, and in addition they tend to keep the plow up-right during use.

At the rear of the beam or draw-bar 26 there is provided the plow share 36 having an elongated mold board 37 which is fastened to the draw-bar 26 in the usual manner. An undercutting blade or undercutter 38 is also provided, and is advantageously connected to the mold board by hinges 40. During operation of the plow, the undercutter is held in the desired position by the hinges 40 and a stop 41, which may conveniently engage one of the scarifiers. The undercutter assists in removing dirt, shell and other material from beneath the pipeline 4 which is being ditched, and, as a result, the pipe generally lays itself in the trench or ditch without any necessity for lifting it. The hinges 40, on which the undercutter 38 is mounted, make it possible to put the plow in position on the pipeline without interference. The telescoping handles 18 of the plow may be clamped at a length corresponding to the depth of the water, as by bolts 42, or the inner members 43 of these handles may be allowed to slide to accommodate varying depths.

Putting the plow on the pipeline and removing it therefrom is conveniently accomplished by a simple crane 44 on the front of the control barge 16. A cable, such as cable 23 after it is disconnected from ring 28, can be passed over a pulley 46 on this crane to a loop 47 on the plow. Such a loop may be provided at the top of one of the pull bars or brackets 30. Operation of the winch 20 then provides a very simple method of raising or lowering the plow.

When the plow 17 is propelled forward along the pipeline 4, it digs a trench 50 parallel with and adjacent to and advantageously partially under the pipeline. The pipeline tends to slide or drop into the ditch as it is formed, due to the force of gravity. Even large pipelines are generally sufficiently flexible to "lay themselves" in the ditch or trench which is formed in accordance with my invention. It is generally advantageous, however, to apply to the pipeline a force which assists its movement into the trench. For this purpose I provide a suitable jack or ram 52 at the rear of the working barge 16. As shown in Figs. 1 and 4, this jack comprises outer guides 54 and 56 and a center guide 58, which are fixedly mounted on the stern of the barge 16. Extending interiorly of the guides 54 and 56 there are provided reciprocable members 59 and 60, of sufficient length to reach down through the outer guides to a bottom member or foot 61 which is connected thereto. This foot may conveniently be of inverted channel shape, or other form adapted to follow the pipeline 4, and as the barge moves along over the pipeline, the foot member 61 of the jack 52 tends to force the pipe to the bottom of the trench 50. The sliding members 59 and 60 are provided with adjustable stops 62, which may be set in accordance with the depth of the water in which operations take place. These stops may be employed to apply the weight of the barge through members 59 and 60 to the foot 61 and the pipe 4, or the sliding members may apply only their own own weight to the foot member, or they may apply any additional force resulting from attaching a weight or spring thereto. In any case, the foot of the jack slides along the pipe and urges it toward the bottom of the ditch.

In the center of the jack 52 there is provided a ram member 64 adapted to reciprocate through the center guide 58. This ram is connected to a lever 66 which is suitably pivoted at 67 to a frame 68 provided for that purpose on the barge 16; and it is operable from the barge to assist the jack in forcing the pipe to the bottom of the ditch. Attachment of the lever 66 to the ram 64 may be effected at various points to facilitate operations in water of varying depths. When the action of the jack sliding along the pipe as described hereinabove is not sufficient to force the pipe into the trench to the desired depth, this action may be assisted by working the lever 66 attached to the ram 64 from the barge, reciprocating the ram against the foot member 61 of the jack.

While my invention has been described hereinabove with a special reference to certain embodiments thereof and practices therein which are considered preferable, it is to be understood that it is not limited to these specific practices and embodiments, but may be otherwise practiced and embodied within the scope of the appended claims.

What I claim is:

1. A method of embedding preliminarily laid submarine pipelines, which comprises forming a trench parallel with and adjacent to a submarine pipeline, simultaneously removing support from below said pipeline to permit it to sink into the trench, and applying force to the top of said pipeline to move it to the bottom of said trench.

2. A method of embedding preliminarily laid submarine pipelines, which comprises progressively forming a trench parallel with and adjacent to a submarine pipeline previously laid on a water bed and simultaneously removing at least a portion of the water bed supporting said pipeline to permit the pipeline to sink into the trench, and progressively applying force to said pipeline to move it to the bottom of said trench.

3. A method of embedding preliminarily laid submarine pipelines, which comprises progressively forming a trench parallel with and adjacent to a submarine pipeline previously laid on a water bed by moving a plow along the pipeline while controlling said plow from the surface of the water, and progressively applying force to said pipeline to move it to the bottom of the trench, said force being applied by means operatively connected with said plow.

4. The method of claim 3, wherein said plow is operatively connected with the pipeline, whereby the pipeline guides the plow and the plow tends to move the pipeline into the trench.

5. The method of claim 3, wherein the plow simultaneously removes at least a portion of the water bed supporting the pipeline.

6. The method of claim 3, wherein the plow is controlled from a barge connected therewith and floating on the surface of the water.

7. The method of claim 3, wherein the plow is controlled from a barge connected therewith and floating on the surface of the water, and wherein said force is progressively applied to the pipeline from the barge.

8. A method of embedding preliminarily laid submarine pipelines, which comprises progressively moving a plow and a floating vessel connected therewith along a previously laid submarine pipeline and thereby forming a trench in the water bed parallel with and adjacent to said pipeline, and applying force to said pipeline to move it to the bottom of the trench, the point of application of said force being moved progressively along the pipeline with said floating vessel.

9. Apparatus for embedding preliminarily laid submarine pipelines, which comprises, in combination, means for forming a trench parallel with and adjacent to a submarine pipeline, means for simultaneously removing support from below said pipeline to permit it to sink into the trench, and means for applying force to said pipeline to move it to the bottom of said trench.

10. Apparatus for embedding preliminarily laid submarine pipelines, which comprises means for progressively forming a trench parallel with and adjacent to a submarine pipeline previously laid on a water bed, means in combination with said first means for simultaneously removing at least a portion of the water bed supporting said pipeline, and means for progressively applying force to said pipeline to move it to the bottom of said trench.

11. Apparatus for embedding preliminarily laid submarine pipelines, which comprises a plow adapted to progressively form a trench parallel with and adjacent to a submarine pipeline previously laid on a water bed, means for moving said plow along the pipeline while controlling it from the surface of the water, and means operatively connected with said plow for progressively applying force to said pipeline to move it to the bottom of the said trench.

12. The apparatus of claim 11, wherein said plow is provided with means for detachably connecting it to said pipeline during use, whereby the plow is guided by the pipeline.

13. The apparatus of claim 11, wherein said plow is provided with an undercutter adapted to remove at least a portion of the water bed supporting the pipeline.

14. The apparatus of claim 11, wherein said means for controlling the plow includes a vessel connected with the plow and adapted to float on the surface of the water above said pipeline.

15. The apparatus of claim 11, wherein said means for controlling the plow includes a floating vessel connected at its front end to the plow and provided at its rear end with means for engaging the pipeline and applying force thereto tending to move the pipeline to the bottom of the trench formed by the plow.

16. In apparatus for embedding preliminarily laid submarine pipelines, a barge adapted to float on the surface of the water above a submarine pipeline, means at the front of the barge for connecting it to a submarine plow, means on the barge for raising and lowering the plow, means at the rear of the barge for engaging the pipeline and applying thereto a force tending to move the pipeline to the bottom of a trench formed by the plow, and means operatively connected with the barge for advancing the barge and the plow along the pipeline.

17. In apparatus for embedding preliminarily laid submarine pipelines, the combination of a vessel adapted to float on the surface of the water above a submarine pipeline being embedded, and a device on the rear of said vessel adapted to apply to said pipeline a force tending to move the pipeline to the bottom of a trench provided therefor, said device comprising a plurality of guide members fixedly attached to said vessel, a terminal member adapted to engage said pipeline, reciprocable members connected to said terminal member and extending upwardly through certain of said guide members, a ram reciprocable through another of said guide members into contact with said terminal member, and means operable from said vessel for reciprocating said ram.

18. In apparatus for embedding preliminarily laid submarine pipelines, the combination of a vessel adapted to float on the surface of the water above a submarine pipeline being embedded, and a plow adapted to form a trench suitable for embedding said pipeline, said plow being provided with handles of adjustable length connected at their upper ends to said vessel, and having a heavy draw beam adapted to rest on the water bed during operation, means at the front of the draw beam for applying force to advance said plow, means for engaging the pipeline to guide the plow as it is advanced, a plowshare adapted to form a suitable trench for said pipeline, and an undercutter hingedly connected to the plow and adapted to remove supporting material from beneath the pipeline when the plow is advanced along the pipeline.

JOHN L. IRVIN.